(12) United States Patent
Morioka

(10) Patent No.: US 8,619,751 B2
(45) Date of Patent: Dec. 31, 2013

(54) COMMUNICATION APPARATUS, COMMUNICATION METHOD, COMPUTER PROGRAM, AND COMMUNICATION SYSTEM

(75) Inventor: Yuichi Morioka, Tokyo (JP)

(73) Assignee: Sony Corporation, Tokyo (JP)

( * ) Notice: Subject to any disclaimer, the term of this patent is extended or adjusted under 35 U.S.C. 154(b) by 133 days.

(21) Appl. No.: 13/202,637

(22) PCT Filed: Jan. 6, 2010

(86) PCT No.: PCT/JP2010/050054
§ 371 (c)(1),
(2), (4) Date: Aug. 22, 2011

(87) PCT Pub. No.: WO2010/100957
PCT Pub. Date: Sep. 10, 2010

(65) Prior Publication Data
US 2011/0305236 A1  Dec. 15, 2011

(30) Foreign Application Priority Data

Mar. 4, 2009  (JP) ................................. P2009-050218

(51) Int. Cl.
*H04J 3/00*  (2006.01)
(52) U.S. Cl.
USPC ............................ 370/345; 370/347; 370/348
(58) Field of Classification Search
USPC ......................................................... 370/345
See application file for complete search history.

(56) References Cited

U.S. PATENT DOCUMENTS

| | | | |
|---|---|---|---|
| 7,321,580 B1 * | 1/2008 | Ramanathan et al. | 370/339 |
| 2003/0152086 A1 * | 8/2003 | El Batt | 370/400 |
| 2005/0169232 A1 * | 8/2005 | Sakoda et al. | 370/347 |
| 2006/0209772 A1 * | 9/2006 | Fang et al. | 370/338 |
| 2008/0009306 A1 * | 1/2008 | Suga et al. | 455/522 |

FOREIGN PATENT DOCUMENTS

| | | | |
|---|---|---|---|
| JP | 3544891 | 4/2004 | |
| JP | 2005-86524 | 3/2005 | |
| JP | 2005086524 A * | 3/2005 | ............. H04L 12/28 |

OTHER PUBLICATIONS

Romit Roy Choudhury et al. Using Directional Antennas for Medium Access Control in Ad Hoc Networks, MOBICOM'02, Sep. 23-28, 2002, Atlanta, Georgia, USA. Copyright 2002 ACM 1-58113-486-X/02/0009.*
International Search Report from the Japanese Patent Office in International Application No. PCT/JP2010/050054 mailed Feb. 9, 2010.
Choudhury, et al., "Using Directional Antennas for Medium Access Control in Ad Hoc Networks", Dept. of Electrical and Computer Engineering, and Coordinated Science laboratory University of Illinois at Urbaba-Champaign, pp. 59-71, (2002).

* cited by examiner

*Primary Examiner* — Otis L Thompson, Jr.
(74) *Attorney, Agent, or Firm* — Sherr & Jiang, PLLC

(57) ABSTRACT

While directional communication using millimeter waves is realized, the number of communication stations through which simultaneous communication is possible is increased to increase the throughput of the entire system.
A communication apparatus stores, as a stop setting person direction, a beam direction in which received electrical power when an RTS or a CTS destined for another station is received becomes a maximum and then sets a transmission stop period. Within the transmission stop period, only when the direction of a frame transmission destination is separate from the stop setting person direction, transmission of frames is performed by directing a transmission beam toward the frame transmission destination. Whereas a hidden terminal does not unnecessarily stop a frame transmission operation, the hidden terminal is not against the intention of requesting the setting of the transmission stop period.

10 Claims, 9 Drawing Sheets

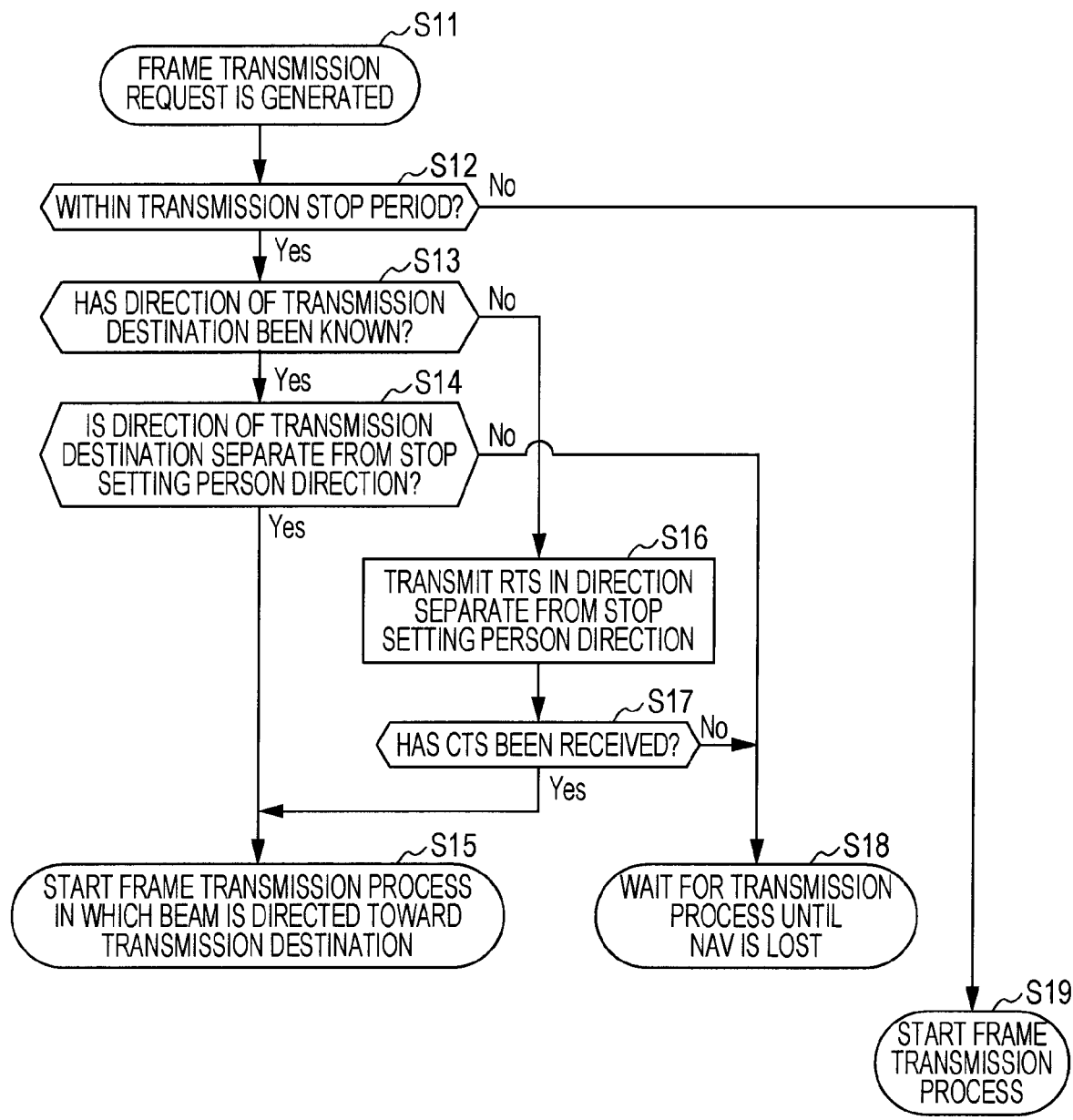

COMMUNICATION APPARATUS, COMMUNICATION METHOD, COMPUTER PROGRAM, AND COMMUNICATION SYSTEM

TECHNICAL FIELD

The present invention relates to a communication apparatus, a communication method, a computer program, and a communication system that perform wireless communication by using, for example, millimeter waves and, more particularly, relates to a communication apparatus, a communication method, a computer program, and a communication system that extend the communication distance of millimeter waves and that direct a beam of a directional antenna toward the position of a communication party.

BACKGROUND ART

Wireless communication called "millimeter wave" communication can realize higher communication speed by using a high-frequency electromagnetic wave. Examples of the main applications of millimeter-wave communication include wireless access communication for a short distance, an image transmission system, simplified wireless communication, and automobile collision prevention radars. Furthermore, at present, technology development for millimeter-wave communication, which is directed toward use promotion, such as realization of large capacity and long distance transmission, size reduction of wireless apparatuses, and reduced cost, has been performed. Here, the wavelength of a millimeter wave corresponds to 10 mm to 1 mm, and the frequency corresponds to 30 GHz to 300 GHz. For example, in wireless communication using a 60 GHz band, since channel assignment is possible in GHz units, very high-speed data communication can be performed.

A millimeter wave has a shorter wavelength and a stronger property of rectilinear propagation compared to microwaves that have become widely popular in a wireless LAN (Local Area Network) technology or the like, and can transmit a very large amount of information. On the other hand, since the attenuation of a millimeter wave as resulting from reflection is intense, for a wireless path for performing communication, a direct wave, and a wave reflected approximately one time at most are mainly used. Furthermore, since the propagation loss of a millimeter wave is large, a millimeter wave has a property such that a radio signal does not reach far places.

In order to compensate for such a travel distance problem of a millimeter wave, a method is considered in which an antenna of a transmitter/receiver is made to have directivity, a transmission beam and a reception beam thereof are directed in a direction in which a communication party is positioned, and a communication distance is extended. The directivity of a beam can be controlled by, for example, providing each of transmitters/receivers with a plurality of antennas, and by changing the transmission weight or the reception weight for each antenna. In millimeter waves, since reflected waves are hardly used, and a direct wave is important, beam shaped directivity is suitable, and a sharp beam is used for directivity. Then, after the optimum directivity of the antenna is learned, millimeter-wave wireless communication may be performed.

For example, a wireless transmission system has been proposed in which second communication means using communication of any one of electrical power line communication, optical communication, and sound wave communication transmits a signal for determining the directional direction of a transmission antenna, and the direction of the transmission antenna is determined, and thereafter, first communication means performs wireless transmission among transmitters/receivers using a radio wave of 10 GHz or higher (see, for example, Patent Document 1).

Furthermore, a method of extending a communication distance by using the directivity of an antenna has been used in IEEE 802.15.3c, which is a standard specification of wireless PAN (mmWPAN: millimeter-wave Wireless Personal Area Network) using a millimeter-wave band.

By the way, in wireless communication, it is known that a hidden terminal problem such that an area in which communication stations cannot directly communicate with one another exists occurs. Since negotiation cannot be made among hidden terminals, there is a probability that transmission operations will collide with one another. As a methodology for solving a hidden terminal problem, a "virtual carrier sense" can be given. According to the virtual carrier sense, the hidden terminal predicts a period in which the medium is used, and stops a transmission operation without performing physical carrier sense during the relevant period. Specifically, duration information for reserving a medium has been described in the header of a MAC (Media Access Control) frame for requesting a stop of transmission. A peripheral station receiving a frame destined for another station expects that a medium is used in the period corresponding to the duration information, and sets a network allocation vector (NAV).

A representative example of a signal transmission/reception sequence using virtual carrier sense is RTS/CTS handshake, and is widely used in a wireless LAN system, such as IEEE 802.11. The communication station of the data transmission source transmits a transmission start request frame RTS (Request To Send), and starts the transmission of data frames in response to the reception of an acknowledgement frame CTS (Clear To Send) from the communication station of the data transmission destination.

Here, each of the control frames of RTS and CTS has a meaning of confirming the preparation situation for data transmission among transmitters/receivers and making hidden terminals in the surroundings not obstruct data transmission. When a hidden terminal for the data transmission side (RTS transmission station) receives a CTS destined for another station, the hidden terminal sets a transmission stop period on the basis of the duration information described in the MAC header thereof. Consequently, it is possible for a data receiving side (CTS transmission station) to avoid a collision with a transmission frame by the relevant hidden terminal, and can reliably receive the data frame. Furthermore, a hidden terminal for the data receiving side (CTS transmission station) receives an RTS destined for another station and sets a transmission stop period.

In the wireless PAN standard IEEE 802.15.3c (described above) using a millimeter-wave band, also, a collision avoidance procedure using an RTS/CTS handshake has been adopted. For example, beamforming of a transmission/reception beam is used with regard to data frames only, and control frames, such as RTS, CTS, and ACK, are transmitted as omni-directional frames. Then, in the surroundings of the communication apparatus, a signal transmission/reception procedure using RTS/CTS handshake is performed, and when the communication apparatus receives an RTS or a CTS that is not destined for its own station, the communication apparatus needs to set a transmission stop period.

However, in the case of a millimeter-wave communication apparatus using beamforming of a transmission beam in the manner described above, despite that the communication apparatus exists in a range in which an RTS or a CTS can reach, even if the communication apparatus transmits a beam-formed frame (beamformed packet) within a transmission stop period, signal transmission/reception procedure in an RTS transmission station or in a CTS transmission station is not sometimes obstructed depending on the direction (or the direction of the position of the communication party) in which the transmission beam id directed.

For example, it is assumed in the directional communication system shown in FIG. 11 that, after RTS/CTS handshake is performed between an STA_A and an STA_B, the STA_A is transmitting a data frame by directing a transmission beam in the direction of the STA_B. On the other hand, an STA_C in the surroundings of the STA_B is assumed to want to transmit frames to the STA_D. At this time, if the STA_C transmits frames by directing a transmission beam in the direction of the STA_D, the STA_C does not obstruct the frame reception of the STA_B. However, when the STA_C receives a CTS from the STA_B, the STA_C sets a transmission stop period, and thus withholds the operation of transmitting frames to the STA_D.

In other words, even if the millimeter-wave communication apparatus receives an RTS or a CTS, which is not destined for its own station, the millimeter-wave communication apparatus does not need to stop the frame transmission operation as long as beamforming is applied. If the frame transmission operation is stopped unnecessarily in spite of that, the number of communication stations that can be communicated with at the same time in the system is uselessly reduced, and there is a concern that the throughput of the entire system is decreased.

CITATION LIST

Patent Literature

Patent Document 1: Japanese Patent No. 3544891

DISCLOSURE OF INVENTION

Technical Problem

An object of the present invention is to provide a superior communication apparatus, a superior communication method, a superior computer program, and a superior communication system that can direct a beam of a directional antenna toward the direction in which a communication party is positioned and can extend the communication distance of millimeter waves.

Another object of the present invention is to provide a superior communication apparatus, a superior communication method, a superior computer program, and a superior communication system that can increase the number of communication stations through which simultaneous communication is possible while realizing high-speed data communication using millimeter waves by using the beamforming of a transmission/reception beam and that can increase the throughput of the entire system.

Another object of the present invention is to provide a superior communication apparatus, a superior communication method, a superior computer program, and a superior communication system that realize high-speed data communication with directivity using millimeter waves and that can increase the number of communication stations through which simultaneous communication is possible so as to increase the throughput of the entire system while avoiding a collision by using RTS/CTS handshake.

Another object of the present invention is to provide a superior communication apparatus, a superior communication method, a superior computer program, and superior a communication system that are capable of performing communication with directivity using millimeter waves without unnecessarily stopping a frame transmission operation even if an RTS or a CTS, which is not destined for its own station, is received.

Technical Solution

The present application has been made by considering the above-described problems. The invention as set forth in claim 1 is a communication apparatus including:

a wireless communication unit capable of performing directional wireless communication in accordance with a communication scheme that uses a predetermined high-frequency band, wherein when a transmission stop request frame that requests that a predetermined transmission stop period be set is received, a direction of a stop setting person in which a transmission source of the transmission stop request frame is positioned is stored, and the transmission stop period is set, and wherein within the transmission stop period, transmission of frames is controlled in accordance with the direction of the stop setting person.

Specific examples of the "transmission stop request frame that requests that a predetermined transmission stop period be set" referred to in the invention of the present application include an RTS, a CTS, and a data frame in which duration information is included.

Furthermore, according to the invention as set forth in claim 2 of the present application, the communication apparatus as set forth in claim 1 is configured in such a manner that when a direction of a frame transmission destination is separate from the direction of the stop setting person, within the transmission stop period, the transmission of frames is performed by directing a transmission beam of the wireless communication unit in the direction of the frame transmission destination.

Furthermore, according to the invention as set forth in claim 3 of the present application, the communication apparatus as set forth in claim 1 is configured so as to further include a power calculation unit that calculates received electrical power when frames are received in each of the plurality of beam directions; and a determination unit that determines a beam direction in which the received electrical power becomes a maximum among the plurality of beam directions, wherein when the transmission stop request frame that requests that a predetermined transmission stop period be set is received, a beam direction in which the received electrical power of the transmission stop request frame becomes a maximum is stored as a direction of the stop setting person, and the transmission stop period is set.

Furthermore, according to the invention as set forth in claim 4 of the present application, the communication apparatus as set forth in claim 1 is configured in such a manner that within the transmission stop period, a transmission start request frame (RTS: Request To Send) is transmitted by directing a transmission beam of the wireless communication unit in the separation direction that is separate from the direction of the stop setting person, and in response to an acknowledgement frame (CTS: Clear To Send) being received, data frames are transmitted by directing a transmission beam of the wireless communication unit toward the separation direction.

Furthermore, according to the invention as set forth in claim 5 of the present application, the communication apparatus as set forth in claim 4 is configured so as to further include a power calculation unit that calculates received electrical power when frames are received in each of the plurality of beam directions; and a determination unit that determines a beam direction in which the received electrical power becomes a maximum among the plurality of beam directions, wherein data frames are transmitted by directing a transmission beam of the wireless communication unit in a beam direction in which the received electrical power of the acknowledgement frame becomes a maximum.

Furthermore, the invention as set forth in claim 6 is a communication method in a communication apparatus including a wireless communication unit capable of performing directional wireless communication in accordance with a communication scheme that has a plurality of beam patterns of different directions and that uses a predetermined high-frequency band, the communication method including:

a step of storing, when a transmission stop request frame that requests that a predetermined transmission stop period be set is received, a direction of a stop setting person in which a transmission source of the transmission stop request frame is positioned;

a step of setting a transmission stop period in response to the transmission stop request frame that requests that a predetermined transmission stop period be set being received; and a step of controlling, when a frame transmission request is generated within the transmission stop period, transmission of the relevant transmission request frame in accordance with the direction of the stop setting person.

Furthermore, the invention as set forth in claim 7 is a computer program written in a computer-readable format for causing a communication process in a communication apparatus to be performed in a computer, the communication apparatus including a wireless communication unit capable of performing directional wireless communication in accordance with a communication scheme that uses a predetermined high-frequency band, the computer program causing the computer to function as:

a storage unit that stores, when a transmission stop request frame that requests that a predetermined transmission stop period be set is received, a direction of a stop setting person in which the transmission source of the transmission stop request frame is positioned;

a transmission stop period set unit that sets the transmission stop period in response to the transmission stop request frame that requests that a predetermined transmission stop period be set being received; and a control unit that controls, when a frame transmission request is generated within the transmission stop period, transmission of the relevant transmission request frame in accordance with the direction of the stop setting person.

The computer program as set forth in claim 7 of the present application is such that a computer program written in a computer-readable format is defined so as to realize predetermined processing in a computer. In other words, by installing the computer program as set forth in claim 7 of the present application into the computer, coordinated operations are exhibited in the computer, and operational effects identical to those of the communication apparatus as set forth in claim 1 of the present application can be obtained.

Furthermore, the invention as set forth in claim 8 of the present application is a communication system including:

a peripheral communication apparatus that transmits a transmission stop request frame that requests that a predetermined transmission stop period be set;

a data-transmission-side communication apparatus that includes a wireless communication unit capable of performing directional wireless communication in accordance with a communication scheme that uses a predetermined high-frequency band, that sets the transmission stop period in response to the transmission stop request frame being received from the peripheral communication apparatus, and that controls transmission of frames in accordance with a direction of a stop setting person in which the peripheral communication apparatus is positioned within the transmission stop period; and a data-receiving-side communication apparatus serving as a transmission destination of the frame from the data-transmission-side communication apparatus.

Note that the "system" referred to herein refers to a logical assembly of a plurality of devices (or function modules which realize specific functions), and it does not particularly matter whether or not each device and function module is within a single housing.

Advantageous Effects

According to the present invention, it is possible to provide a superior communication apparatus, a superior communication method, a superior computer program, and a superior communication system that can direct a beam of a directional antenna toward the direction in which a communication party is positioned and can extend the communication distance of millimeter waves.

Furthermore, according to the present invention, it is possible to provide a superior communication apparatus, a superior communication method, a superior computer program, and a superior communication system that realize high-speed data communication using millimeter waves by using the beamforming of a transmission/reception beam and that can increase the number of communication stations through which simultaneous communication is possible so as to increase the throughput of the entire system.

Furthermore, according to the present invention, it is possible to provide a superior communication apparatus, a superior communication method, a superior computer program, and a superior communication system that realize high-speed data communication with directivity using millimeter waves and that can increase the number of communication stations through which simultaneous communication is possible so as to increase the throughput of the entire system while avoiding a collision by using RTS/CTS handshake.

According to the invention as set forth in claims 1, 6, 7, and 8 of the present application, when the communication apparatus receives a transmission stop request frame, the communication apparatus stores, as a direction of a stop setting person, a beam direction in which the received electrical power becomes a maximum, and sets a transmission stop request frame, and when a frame transmission request is generated within the transmission stop period, the communication apparatus can control the transmission of the relevant transmission request frame. Therefore, the communication apparatus can perform directivity communication using millimeter waves without unnecessarily stopping a frame transmission operation even within the transmission stop period. As a result, as the whole of the system, the number of communication stations through which simultaneous communication is possible is increased, and the throughput is increased.

Furthermore, according to the invention as set forth in claim 2 of the present application, the communication apparatus within the transmission stop period performs transmission of frames by directing a transmission beam toward a frame transmission destination only when the direction of the frame transmission destination is separate from the stop setting person direction. Consequently, whereas a frame transmission operation is not stopped unnecessarily, the communication apparatus is not against the intention of requesting the setting of the transmission stop period because signal transmission/reception of a peripheral station in which RTS/CTS handshake is being performed is not obstructed.

Furthermore, according to the invention as set forth in claim 3 of the present application, the communication apparatus uses, as a stop setting person direction, a beam direction in which the received electrical power of the transmission stop request frame becomes a maximum, and thus can transmit frames by directing a transmission beam toward a communication party in a direction that is separate from the stop setting person direction even within the transmission stop period.

Furthermore, according to the invention as set forth in claims 4 and 5 of the present application, the communication apparatus is configured to transmit an RTS by directing a transmission beam toward a separation direction that is separate from the stop setting person direction even when the direction of the position of the communication party that is the transmission destination of the frames is not known. Therefore, when the CTS can successfully be received, it is possible to confirm that the transmission destination of the frames exists in the separation direction. Furthermore, it is possible to transmit data frames by directing a transmission beam toward the separation direction.

Further objects, features, and advantages of the present invention will become apparent from the following detailed description of embodiments (to be described later) of the present invention and drawings attached thereto.

BRIEF DESCRIPTION OF DRAWINGS

FIG. 9 is a flowchart illustrating a processing procedure performed when the communication apparatus 100 transmits frames.

BEST MODES FOR CARRYING OUT THE INVENTION

Embodiments of the present invention will be described below in detail with reference to the drawings. Meanwhile, examples of a communication scheme for millimeter waves include a 60 GHz band used in the VHT (Very High Throughput) standard. However, the gist of the present invention is not limited to a specific frequency band.

Figure 1:
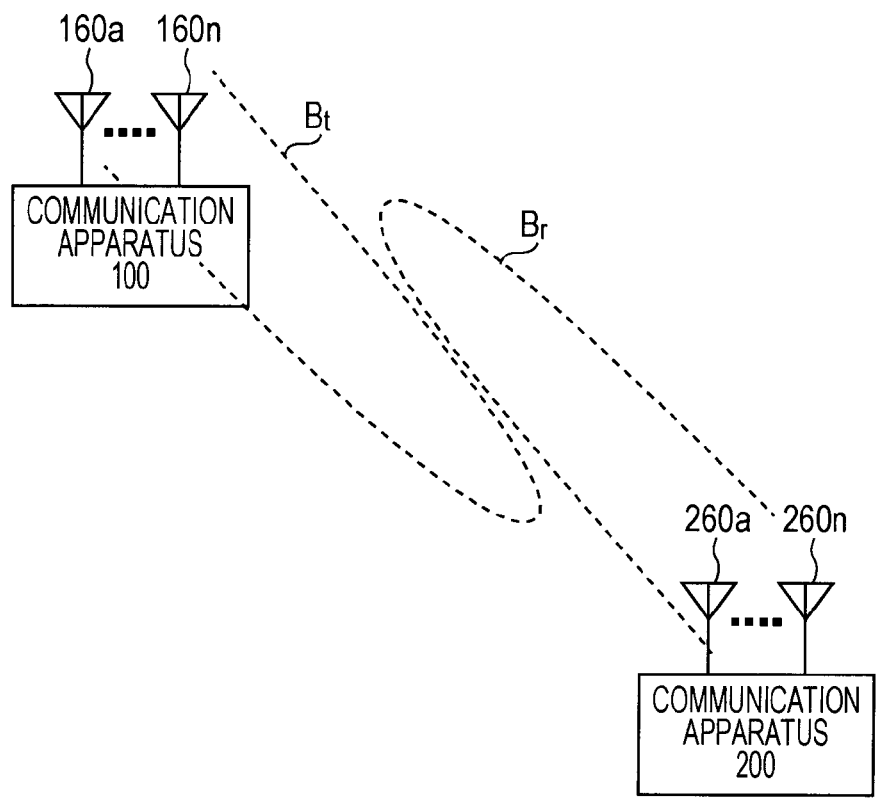
FIG. 1 schematically shows an example of the configuration of a millimeter-wave wireless communication system according to an embodiment of the present invention.

FIG. 1 schematically shows an example of the configuration of a millimeter-wave wireless communication system according to an embodiment of the present invention. The wireless communication system shown in the figure is constituted by a communication apparatus 100 and a communication apparatus 200.

It is possible for the communication apparatuses 100 and 200 to perform wireless communication with each other in accordance with a millimeter-wave communication scheme. In the millimeter-wave communication scheme, since rectilinear propagation characteristics are strong, and attenuation is large at the time of reflection, more preferably, a radio signal is received by directing a transmission beam and a reception beam toward a communication party.

In the example shown in FIG. 1, the communication apparatus 100 includes a plurality of antennas $160a$ to $160n$ for transmitting and receiving a radio signal in accordance with the millimeter-wave communication scheme. Then, by adjusting the weight of a signal that is transmitted via each of the antennas $160a$ to $160n$, the directivity $B_t$ of a transmission beam is controlled. In the example shown in the figure, the transmission beam $B_t$ is directed in the direction of the position of the communication apparatus 200 acting as a communication party.

Furthermore, the communication apparatus 200 includes a plurality of antennas $260a$ to $260n$ for receiving a radio signal in accordance with the millimeter-wave communication scheme. Then, by adjusting the weight of the signal received via each of the antennas $260a$ to $260n$, the directivity $B_r$ of a reception beam is controlled. In the example in the figure, the reception beam $B_r$ is directed in the direction of the position of the communication apparatus 100 acting as a communication party.

Figure 2:
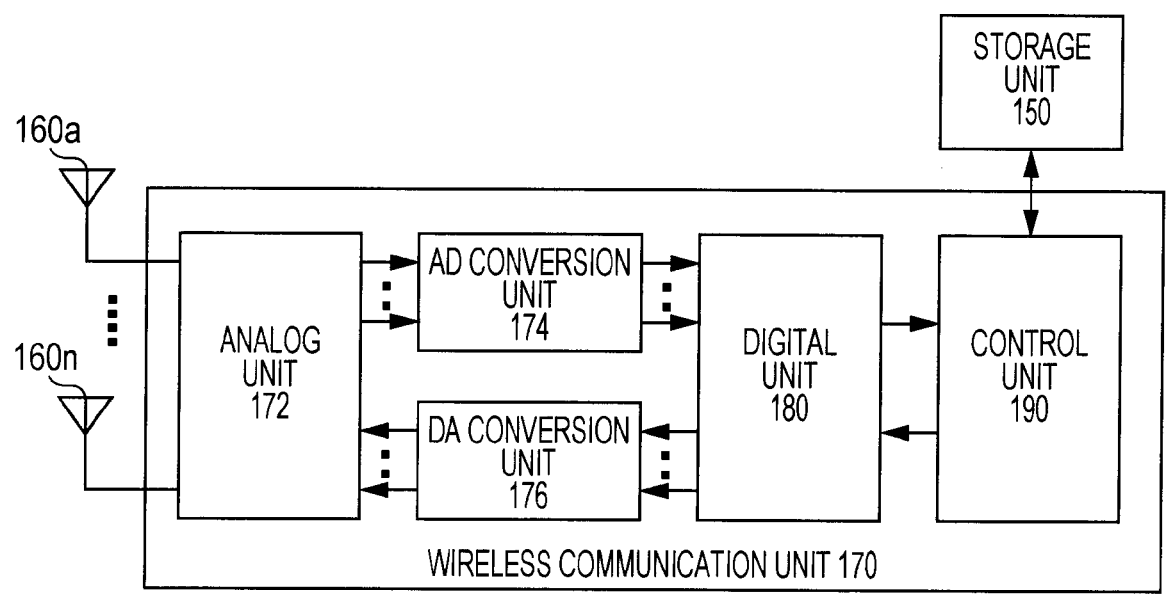
FIG. 2 illustrates an example of the configuration of a communication apparatus 100.

FIG. 2 illustrates an example of the configuration of the communication apparatus 100. The communication apparatus 100 shown in the figure may operate as a broadband router or a wireless access point. Meanwhile, although not shown in the figure, the communication apparatus 200 may also be configured in a similar manner.

The communication apparatus 100 includes a storage unit 150, the plurality of antennas 160a to 160n, and a wireless communication unit 170. The wireless communication unit 170 is constituted by an analog unit 172, an AD conversion unit 174, a DA conversion unit 176, a digital unit 180, and a control unit 190.

The plurality of antennas 160a to 160n are used for wireless communication in accordance with the millimeter-wave communication scheme. Specifically, each of the antennas 160a to 160n transmits a radio signal that has been subjected to weighting using a predetermined weight coefficient by using a millimeter wave. Furthermore, the antennas 160a to 160n receive a millimeter-wave radio signal and outputs it to the analog unit 172.

The analog unit 172 typically corresponds to an RF circuit for transmitting and receiving a radio signal in accordance with the millimeter-wave communication scheme. That is, the analog unit 172 performs low-noise amplification on the plurality of respective reception signals received by the antennas 160a to 160n and down-converts the reception signals, and outputs them to the AD conversion unit 174 at a subsequent stage. Furthermore, the analog unit 172 up-converts, into an RF band, the plurality of transmission signals that have been converted into corresponding analog signals by the DA conversion unit 176, power-amplifies the signals, and outputs them to the respective antennas 160a to 160n.

The AD conversion unit 174 converts the plurality of analog reception signals input from the analog unit 172 into corresponding digital signals, and outputs the digital signals to the digital unit 180 at a subsequent stage. Furthermore, the DA conversion unit 176 converts a plurality of digital transmission signals input from the digital unit 180 into corresponding analog signals, and outputs the analog signals to the analog unit 172.

The digital unit 180 is typically constituted by a circuit for demodulating and decoding a reception signal in accordance with the millimeter-wave communication scheme, and a circuit for coding and modulating a transmission signal in accordance with the millimeter-wave communication scheme.

Figure 3:
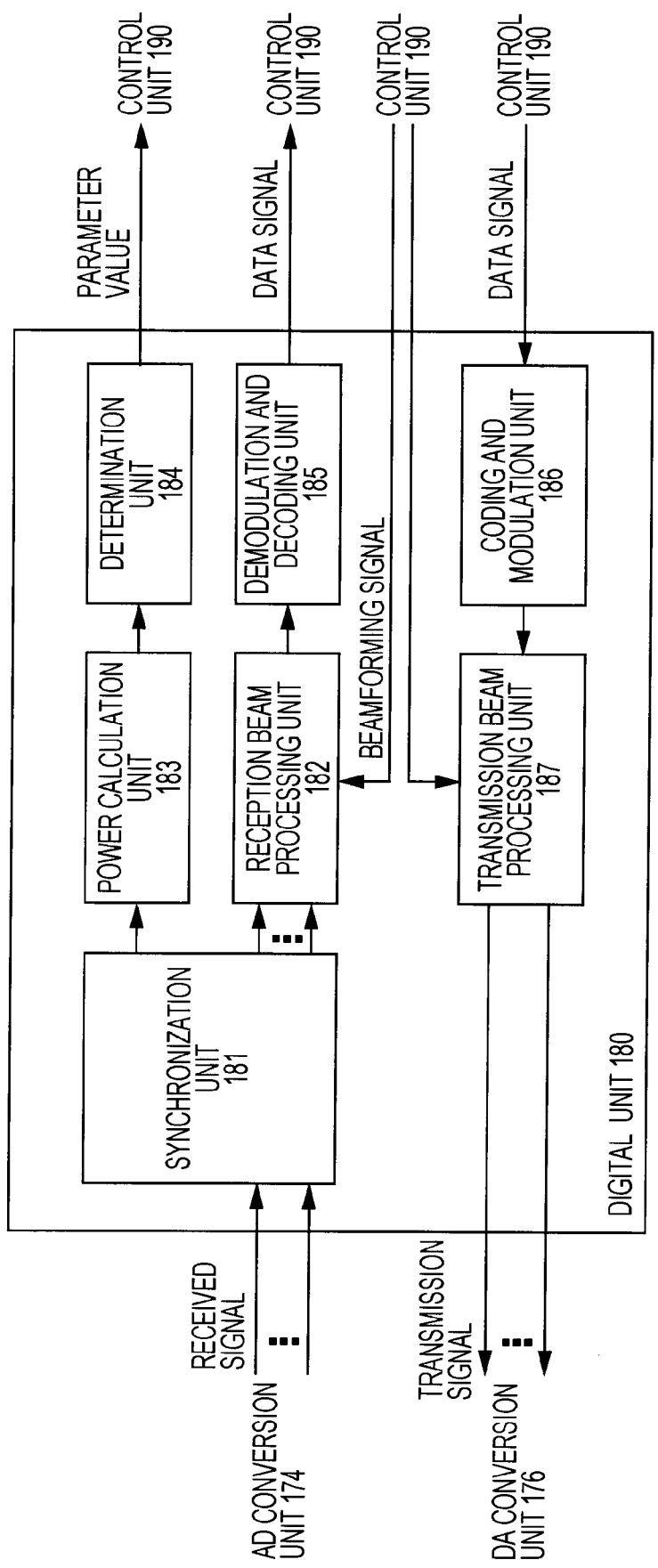
FIG. 3 illustrates an example of the internal configuration of a digital unit 180.

FIG. 3 illustrates an example of the internal configuration of the digital unit 180. As shown in the figure, the digital unit 180 is constituted by a synchronization unit 181, a reception beam processing unit 182, a power calculation unit 183, a determination unit 184, a demodulation and decoding unit 185, a coding and modulation unit 186, and a transmission beam processing unit 187.

The synchronization unit 181 synchronizes, for example, the start times of the reception processes of the plurality of reception signals that are received by the plurality of antennas 160a to 160n on the basis of the beginning preamble of a frame, and outputs the reception signals to the reception beam processing unit 182.

The reception beam processing unit 182 performs a weighting process on the plurality of reception signals input from the synchronization unit 181 in accordance with, for example, a uniform distribution or a Taylor distribution, thereby controlling the directivity of the reception beam. Then, the reception beam processing unit 182 outputs the weighted reception signal to the power calculation unit 183 and the demodulation and decoding unit 185.

When the optimum transmission/reception beam direction is to be learnt, the power calculation unit 183 calculates the received electrical power of the reception signal that is transmitted and received in each transmission/reception beam direction, and sequentially outputs it to the determination unit 184. Then, the determination unit 184 determines the optimum transmission beam direction or the optimum reception beam direction on the basis of the received power value input from the power calculation unit 183. Then, the parameter value for specifying the determined beam direction is stored in the storage unit 150 through the control unit 190. The optimum beam direction referred to herein typically corresponds to the beam direction in which a series of received power values input from the power calculation unit 183 with regard to one beam learning signal become a maximum value.

The demodulation and decoding unit 185 demodulates and decodes the reception signal weighted by the reception beam processing unit 182 in accordance with an arbitrary modulation scheme and an arbitrary coding scheme used in the millimeter-wave communication scheme, and obtains a data signal. Then, the demodulation and decoding unit 185 outputs the obtained data signal to the control unit 190.

The coding and modulation unit 186 codes and modulates the data signal input from the control unit 190 in accordance with an arbitrary coding scheme and an arbitrary modulation scheme used in the millimeter-wave communication scheme, and generates a transmission signal. Then, the coding and modulation unit 186 outputs the generated transmission signal to the transmission beam processing unit 187.

The transmission beam processing unit 187 generates a plurality of transmission signals that have been weighted in accordance with, for example, a uniform distribution or a Taylor distribution, from the transmission signal input from the coding and modulation unit 186, and controls the directivity of the transmission beam. The value of the weight used by the transmission beam processing unit 187 is specified by, for example, a beamforming signal input from the control unit 190. The plurality of transmission signals that have been weighted by the transmission beam processing unit 187 are each output to the DA conversion unit 176.

Referring back to FIG. 2, the description of the configuration of the wireless communication apparatus 100 will be continued. The control unit 190 is configured, for example, by using a computation device such as a microprocessor, and controls the overall operation of the wireless communication unit 170. Furthermore, the control unit 190 obtains a parameter value for identifying the optimum transmission beam direction or reception beam direction from the storage unit 150, and outputs, to the transmission beam processing unit 185 in the digital unit 180, a beamforming signal for instructing that a weight coefficient is provided to each of the antennas 160a to 160n so that a beam direction that is identified on the basis of the parameter value is formed. As a result, an optimum beam pattern such that the transmission beam or the reception beam at the time of wireless transmission in accordance with the millimeter-wave communication scheme by the wireless communication apparatus 100 is directed in the direction in which the communication party is positioned is formed.

Figure 4:
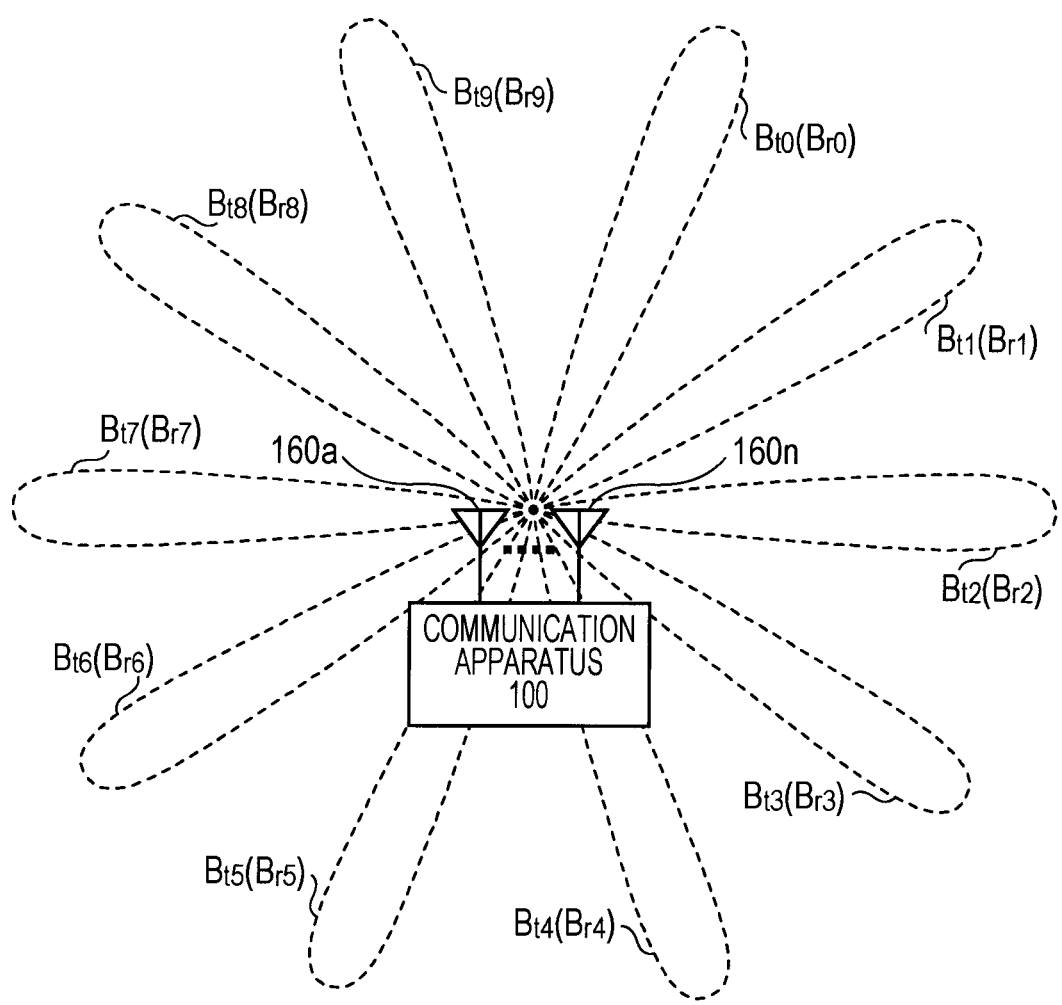
FIG. 4 illustrates an example of a transmission beam pattern that can be formed by the communication apparatus 100 through beamforming of a transmission beam by a transmission beam processing unit 185.

FIG. 4 illustrates an example of a transmission beam pattern that can be formed by the communication apparatus 100 in accordance with the beamforming of a transmission beam by the transmission beam processing unit 185. In the example shown in the figure, it is possible for the communication apparatus 100 to form ten transmission beam patterns $B_{r0}$ to $B_{r9}$. The transmission beam patterns $B_{r0}$ to $B_{r9}$ have directivities in a direction that differ by 36 degrees in the plane in which the communication apparatus 100 is positioned.

The transmission beam processing unit 185 forms any one transmission beam pattern among such ten transmission beam patterns $B_{r0}$ to $B_{r9}$ by providing each of the antennas 160a to 160n with a weight coefficient in response to the beamforming signal from the control unit 190, making it possible to transmit a directional radio signal. Furthermore, the reception beam patterns that can be formed by the communication apparatus 100 may also be beam patterns similar to the transmission beams $B_{t0}$ to $B_{t9}$ shown in FIG. 4. That is, the reception beam processing unit 182 forms a reception beam pattern that matches any one (or combination of two or more) of such ten reception beam patterns $B_{r0}$ to $B_{r9}$ by providing a weight coefficient to each of the antennas 160a to 160n in response to the beamforming signal from the control unit 190, making it possible to cause a radio signal in accordance with the millimeter-wave communication scheme to be received by the antennas 160a to 160n. The storage unit 150 of the communication apparatus 100 is stored in advance with parameter values for identifying weight coefficients for each of the antennas 160a to 160n for forming these transmission/reception beam patterns $B_{t0}$ to $B_{t9}$ and $B_{r0}$ to $B_{r9}$, respectively.

Meanwhile, the transmission beam pattern and the reception beam pattern that can be formed by the communication apparatus 100 are not limited to the example shown in FIG. 4. For example, the plurality of antennas 160a to 160n can be configured so that a transmission beam pattern or a reception beam pattern having directivity in various directions in the three-dimensional space can be formed.

Figure 5:
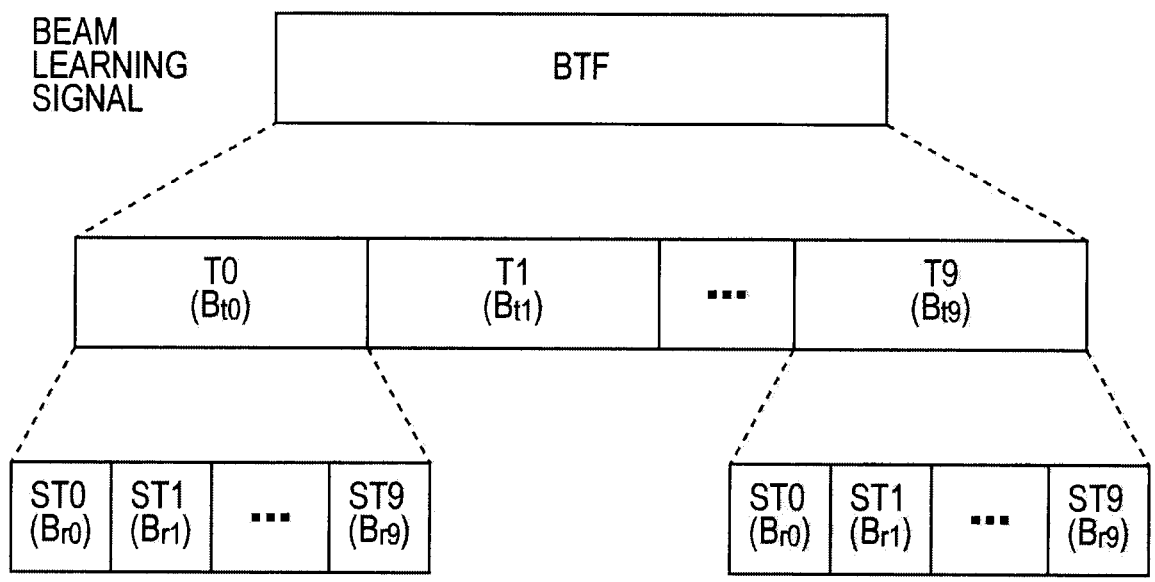
FIG. 5 illustrates an example of a signal format of a beam learning signal used for learning an optimum beam direction.

FIG. 5 illustrates an example of a signal format of a beam learning signal used for learning an optimum beam direction. However, in the figure, the description of the header part is omitted. A beam learning signal BTF (Beam Training Field) shown in the figure is transmitted in accordance with the millimeter-wave communication scheme from the plurality of antennas 160a to 160n possessed by a communication party. The learning signal sequence carried in the beam learning signal BTF may be, for example, a random pattern of BPSK (Binary Phase Shift Keying).

The beam learning signal shown in the figure is such that a learning signal sequence for each of the transmission beam patterns $B_{t0}$ to $B_{t9}$ is multiplexed on a time-division basis. The beam learning signal BTF is made up of ten time slots T0 to T9 corresponding to the transmission beam patterns $B_{t0}$ to $B_{t9}$ shown in FIG. 5, respectively. Then, in each of the time slots T0 to T9, ten kinds of learning signal sequences in which each of the antennas 160a to 160n has been weighted by a weight coefficient for forming each of the transmission beam patterns $B_{t0}$ to $B_{t9}$ with respect to a predetermined known signal sequence are sequentially transmitted. Therefore, the directivity of the transmission beam of the beam learning signal is sequentially changed as in the transmission beam patterns $B_{t0}$ to $B_{t9}$ shown in FIG. 5 for each of the time slots T0 to T9.

On the receiving side in which this beam learning signal BTF is received, the electrical power level of the reception signal for each of the time slots T0 to T9 (that is, for each learning signal sequence) of the beam learning signal BTF is sequentially observed. As a result, the electrical power level of the reception signal becomes a prominent value in one of the time slots of the beam learning signal BTF. The time slot in which the electrical power level of the reception signal becomes a peak changes in response to the position relative to the transmission side that transmits the beam learning signal BTF. Then, the transmission beam pattern corresponding to the time slot in which the received electrical power level becomes a peak can be determined to be the optimum transmission beam pattern for the transmission side.

Furthermore, it is assumed that the receiving side of the beam learning signal BTF can form ten reception beam patterns $B_{r0}$ to $B_{r9}$ identical to the transmission beam patterns $B_{t0}$ to $B_{t9}$ shown in FIG. 4. Then, each of the time slots T0 to T9 of the beam learning signal BTF is further divided into small sections ST0 to ST9 in units of 10, and the reception signal is weight-processed by ten kinds of different reception beam patterns $B_{r0}$ to $B_{r9}$ in each of the small sections ST0 to ST9. In the example shown in FIG. 5, the first small section ST0 of the time slot T0 is associated with a reception beam pattern $B_{r0}$, the second small section ST1 of the time slot T0 is associated with a reception beam pattern $B_{r1}$, ..., the first small section ST0 of the time slot T9 is associated with a reception beam patterns $B_{r0}$, .... With such a reception beam beamforming process, in one beam learning signal BTF, reception signals that are transmitted and received by ten kinds of transmission beam patterns×ten kinds of reception beam patterns=total of 100 transmission/reception beam patterns can be obtained.

The power calculation unit 183 shown in FIG. 3 calculates each of the received electrical powers of the reception signals that are transmitted and received by the above-mentioned total of 100 kinds of transmission/reception beam patterns, and sequentially outputs it to the determination unit 184. Then, on the basis of the input received power value, the determination unit 184 determines parameter values for identifying the optimum transmission beam pattern and reception beam pattern. The optimum beam pattern is typically a beam pattern in which a series of received power values input from the power calculation unit 183 with regard to one beam learning signal become a maximum value. The parameter value for identifying the optimum transmission beam pattern may be, for example, the time slot number (T0 to T9) of one of the beam learning signals BTF. Furthermore, the parameter value for identifying the optimum reception beam pattern may be, for example, a small section number (ST0 to ST9) shown in FIG. 5. The determination unit 184 outputs the parameter value that is determined in this manner to the control unit 190. Furthermore, the parameter value (T0 to T9) for identifying the optimum transmission beam pattern may be fed back to the transmission side of the beam learning signal BTF. However, this feedback procedure is not directly related to the gist of the present invention, and the description thereof is thus omitted in this specification.

The wireless communication system using millimeter waves can expand the communication range by using a plurality of transmission and reception antennas and by forming sharp antenna directivity (that is, beam-shaped antenna directivity). However, as has already been described in the section of Background Art, when a virtual carrier sense is used to avoid collisions resulting from a hidden terminal problem, the communication apparatus receiving a frame destined for another station sets a transmission stop period on the basis of the duration information described in the MAC header of this received frame.

Here, in a case where the communication apparatus that has set the transmission stop period performs millimeter-wave communication by using beamforming of a transmission beam, it is considered that, depending on the direction in which the transmission beam is directed, the communication apparatus can transmit a directional frame to its communication party without obstructing the signal transmission/reception procedure performed by the RTS or CTS transmission source.

Figure 6:
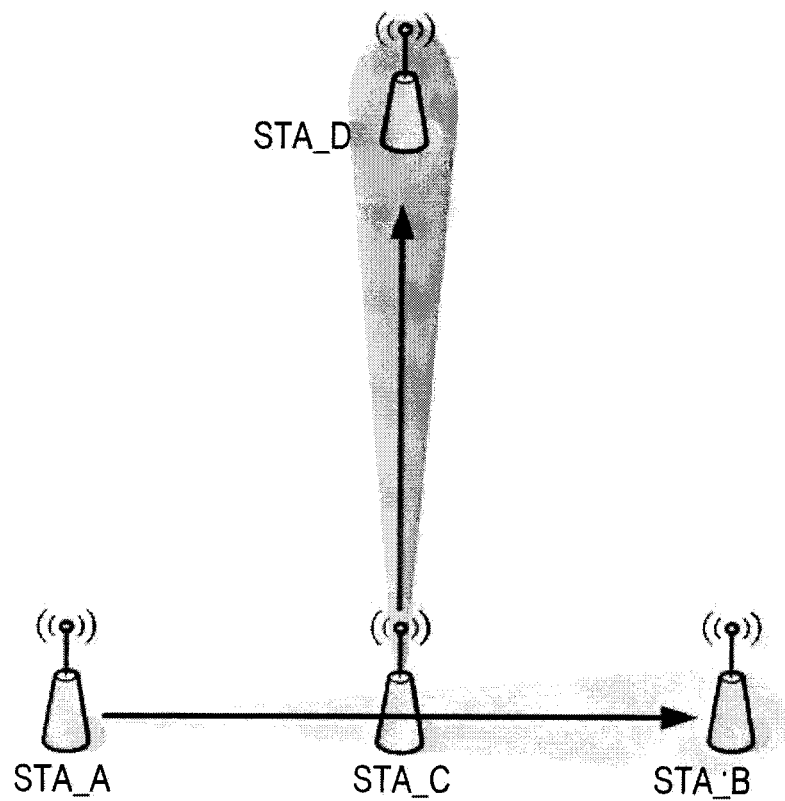
FIG. 6 illustrates an example of the configuration of a directivity communication system in which a direction in which a hidden terminal directs a transmission beam is different from a stop setting person direction.
Figure 11:
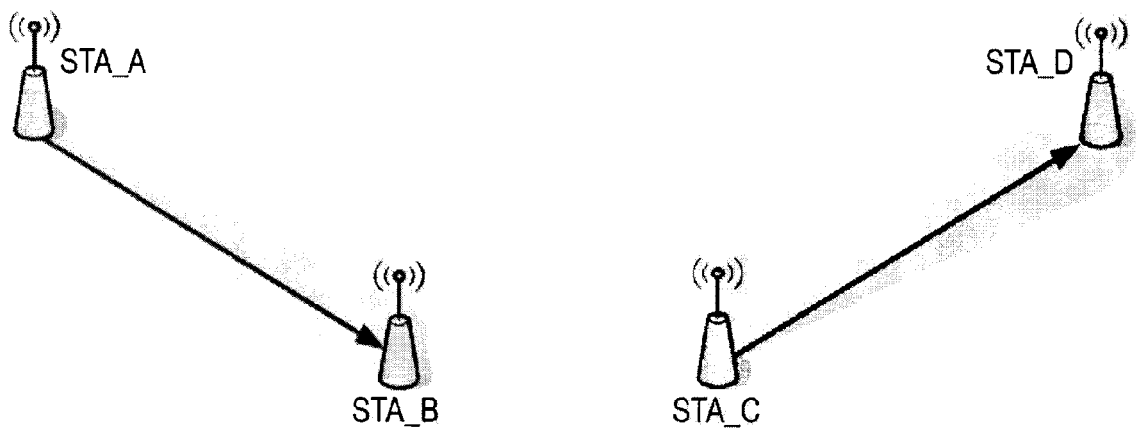
FIG. 11 illustrates an example of the configuration of a directivity communication system in which a direction in which the hidden terminal directs a transmission beam is different from a stop setting person direction.

For example, in the system configuration shown in FIGS. 11 and 6, if the STA_C transmits frames by directing a transmission beam toward the STA_D positioned in a direction different from the STA_B while receiving a CTS destined for the STA_A from the STA_B, the STA_C does not obstruct the frame reception of the STA_B.

For the communication apparatus that can perform directional communication without giving actual damage like the STA_C in FIGS. 11 and 6, the transmission stop is an unnecessary transmission stop. As a result, the number of communication stations that can be communicated with at the same time in the system is uselessly reduced, and there is a concern that the throughput of the entire system is decreased.

Figure 7:
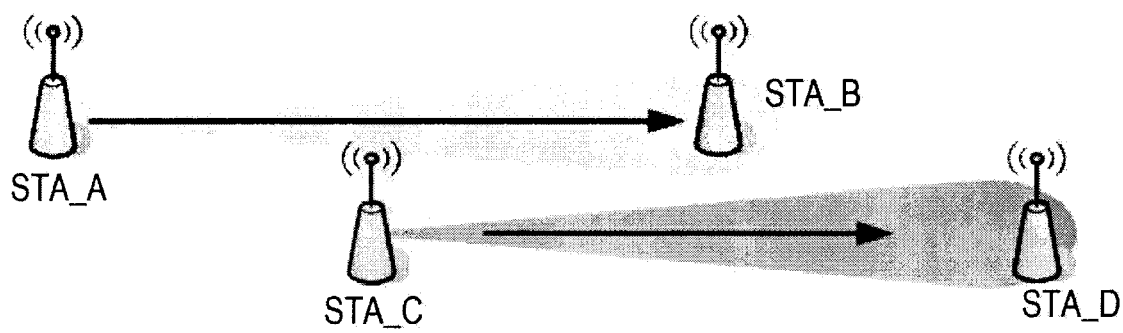
FIG. 7 illustrates an example of the configuration of a directivity communication system in which a direction in which a hidden terminal directs a transmission beam is the same as a stop setting person direction.

On the other hand, in the example shown in FIG. 7, the STA_C performs beamforming of a transmission/reception beam in a similar manner. Since the transmission/reception beam overlaps the direction (or the direction in which the STA_B directed the reception beam to the STA_A, which is a communication party) in which the STA_A directed the transmission beam to the STA_B, which is a communication party, unless the STA_B transmits a CTS so as to cause the STA_C, which is a hidden terminal, to set a transmission stop period, the STA_B cannot receive data frames from the STA_A.

Accordingly, in an embodiment of the present invention, in a case where the communication apparatus 100 receives a transmission stop request frame destined for another station and operates as a hidden terminal, the communication apparatus 100 stores the beam direction in which the received electrical power thereof becomes a maximum as a direction of the stop setting person and also sets a transmission stop period. When a frame transmission request is generated in the transmission stop period, the communication apparatus 100 controls the transmission of the transmission request frame in accordance with the direction of the stop setting person. However, the "transmission stop request frame" referred to herein is an RTS, a CTS, a data frame, or the like in which the aim of requesting that the transmission stop period be set, such as duration information, is described.

Specifically, in the transmission stop period that is set after receiving a transmission stop request frame, the communication apparatus 100 performs the transmission of frames by directing a transmission beam toward this frame transmission destination only when the direction of the frame transmission destination is separate from the direction of the stop setting person. Therefore, whereas the communication apparatus 100 as a hidden terminal does not stop the frame transmission operation unnecessarily, the communication apparatus 100 does not obstruct signal transmission and reception of peripheral stations that are performing RTS/CTS handshake. Thus, the communication apparatus 100 is not against the intent of requesting the setting of the transmission stop period.

As a result of the above, the communication apparatus 100 itself can efficiently perform a millimeter-wave communication operation, and when viewed as the whole of the system, the number of communication stations through which simultaneous communication is possible is increased. Thus, it is expected that the throughput is increased.

Figure 8:
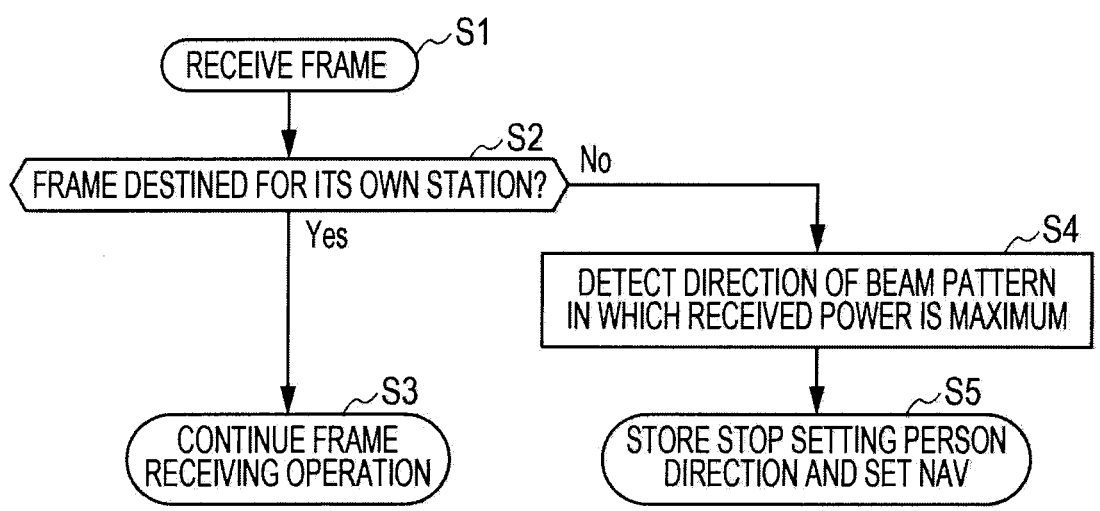
FIG. 8 is a flowchart illustrating a processing procedure performed when the communication apparatus 100 receives frames.

FIG. 8 illustrates, in the form of a flowchart, a processing procedure when the communication apparatus 100 receives frames. However, the frame is assumed to be a transmission stop request frame in which the aim of requesting that a transmission stop period, such as the duration information be set, is described. This processing procedure is realized, for example, by executing a predetermined control program by the control unit 190.

This processing procedure is started up in response to the communication apparatus 100 receiving a frame (step S1). First, the communication apparatus 100 confirms whether or not the reception frame is destined for its own station (step S2).

Here, when the reception frame is destined for its own station (Yes in step S2), the communication apparatus 100 does not set a transmission stop period, and performs the usual reception process for the relevant frame in a continued manner (step S3).

On the other hand, when the reception frame is not destined for its own station (No in step S2), while the communication apparatus 100 is receiving the relevant frame, the electric power calculation unit 183 measures the electric power of the reception signal while changing the reception beam pattern, for example, by 360 degrees for each predetermined angle by the electric power calculation unit 183, and the determination unit 184 detects the direction of the reception beam in which the received electrical power becomes a maximum (step S4).

Then, the communication apparatus 100 stores, as a "direction of the stop setting person" in which the transmission source of the transmission stop request frame is positioned, the direction of the reception beam in which the received electrical power becomes a maximum in the storage unit 150, and sets the transmission stop period for only the period corresponding to the duration information (step S5).

Furthermore, FIG. 9 illustrates, in the form of a flowchart, a processing procedure performed by the communication apparatus 100 at a time of frame transmission. This processing procedure is realized, for example, by executing a predetermined control program by the control unit 190.

This processing procedure is started up (step S11) in response to a frame transmission request being generated in, for example, a high-order layer of a communication protocol. First, it is confirmed whether or not the communication apparatus 100 is within the transmission stop period (step S12).

Here, when the communication apparatus 100 is not in the transmission stop period (No in step S12), the communication apparatus 100 performs the usual frame transmission operation (step S19).

On the other hand, when the communication apparatus 100 is within the transmission stop period (Yes in step S12), next, the communication apparatus 100 confirms whether or not the direction of the frame transmission destination is already known, that is, whether or not the direction of the optimal transmission beam has already been learned (step S13).

Then, if the direction of the frame transmission destination is already known (Yes in step S13), it is further confirmed whether or not the direction of the frame transmission destination is separate from the direction of the stop setting person that has been stored at the time of the setting of the transmission stop period (step S14).

When the direction of the frame transmission destination is separate from the direction of the stop setting person (Yes in step S14), as long as the communication apparatus 100 performs beamforming by directing a transmission beam in the direction of the frame transmission destination and transmits frames, the communication apparatus 100 does not obstruct the signal transmission and reception process of a peripheral station that requested that the transmission stop period be set. Accordingly, the communication apparatus 100 transmits directional frames by directing a transmission beam in the direction of the frame transmission destination, which is separate from the direction of the stop setting person (step S15).

Furthermore, when the direction of the frame transmission destination is known (Yes in step S13), but the direction is not sufficiently separate from the direction of the stop setting person (No in step S14), if the frame is transmitted as is, the signal transmission and reception process of the peripheral station that has requested the setting of the transmission stop period will be obstructed. Thus, the communication apparatus 100 waits for the frame transmission operation until the transmission stop period ends (step S18).

Furthermore, when the direction of the frame transmission destination is not known (No in step S13), the communication apparatus 100 controls the transmission of the frame after confirming the direction of the frame transmission destination.

Specifically, the communication apparatus 100 transmits an RTS (Beamformed RTS) by directing a transmission beam toward the separation direction that is sufficiently separate from the direction of the stop setting person (step S16). For a reference value of the sufficiently separate direction, for example, a value that is experimentally determined in advance can be used. Furthermore, the separation direction is not limited to a single direction, and a plurality of directions that satisfy the reference value may be used. In the case of the latter, in step S16, an RTS may be transmitted toward each of the separation directions for a plurality of times.

If the position of the transmission destination of the frame is in this separation direction, the transmission side for the frame receives an RTS (Beamformed RTS) and sends back a CTS. However, if the position of the transmission side of the frame is not in this separation direction, since an RTS (Beamformed RTS) cannot be received, a CTS is not sent back. Therefore, when the communication apparatus 100 can receive a CTS from the transmission destination of the RTS (Beamformed RTS) (Yes in step S17), it can be determined that the direction of the frame transmission destination is sufficiently separate from the direction of the stop setting person, the communication apparatus 100 transmits a directional frame by directing a transmission beam in the direction of the frame transmission destination, which is the relevant separation direction (step S15).

When a CTS cannot be received (No in step S17), since it is determined that the direction of the frame transmission destination is not sufficiently separate from the direction of the stop setting person, the communication apparatus 100 waits for the frame transmission operation until the transmission stop period ends (step S18).

Figure 10A:
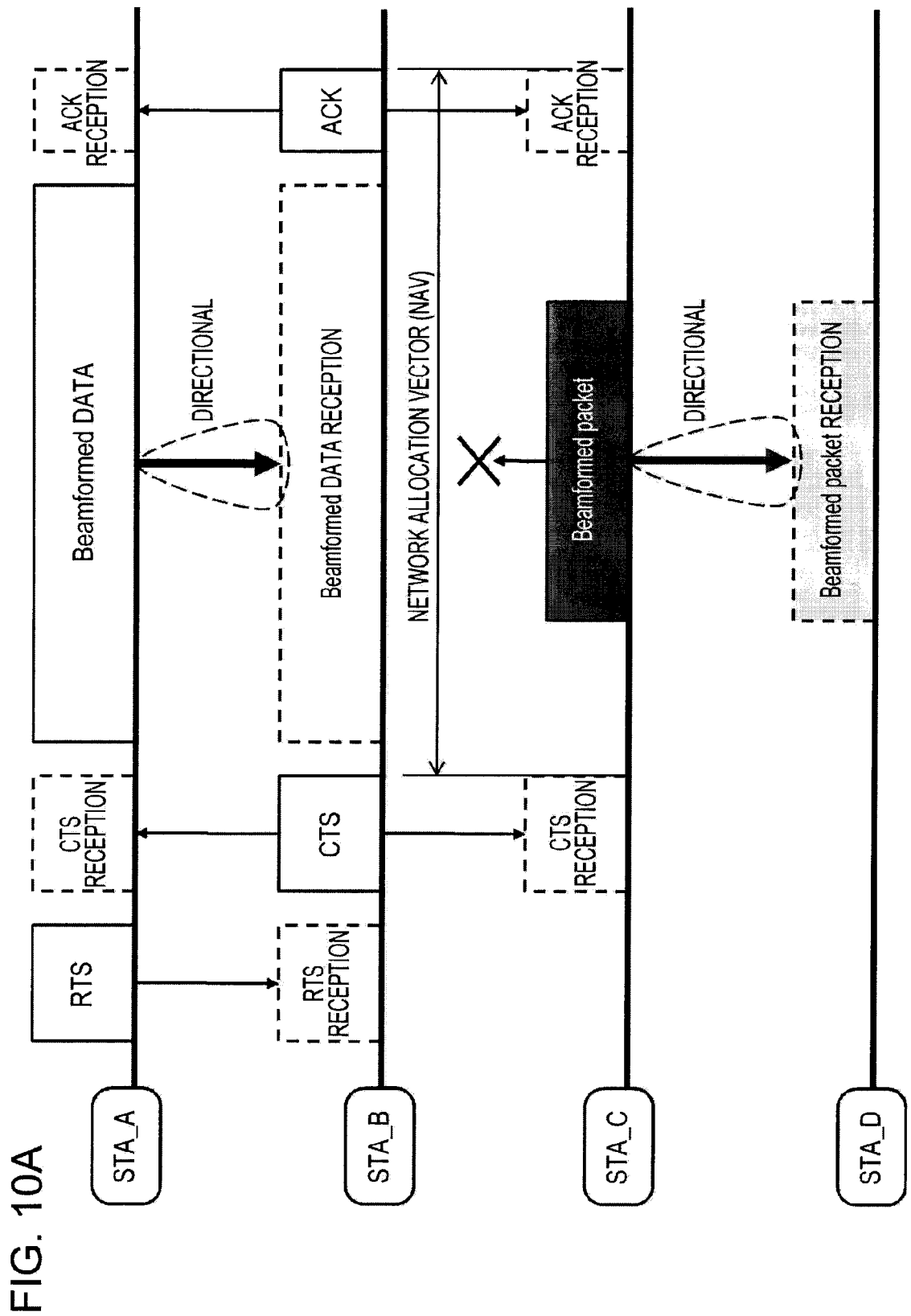
FIG. 10A illustrates an example of a signal transmission/reception sequence in a case where when an STA_A and an STA_B perform RTS/CTS handshake, a hidden terminal STA_C for the STA_A operates in accordance with FIGS. 8 and 9.

FIG. 10A illustrates an example of a signal transmission/reception sequence in a case where when the STA_A and the STA_B perform RTS/CTS handshake, the hidden terminal STA_C for the STA_A operates in accordance with FIGS. 8 and 9. However, it is assumed that each of the communication stations STA_A to STA_D is constituted by the communication apparatus 100 shown in FIGS. 2 to 4.

First, the STA_A confirms that a medium is clear for only a fixed period in accordance with the procedure of CSMA, and thereafter transmits an RTS to the STA_B, which is the data receiving side.

When the STA_B receives an RTS destined for its own station from the STA_A, after a predetermined frame interval SIFS has passed, the STA_B sends back a CTS.

It is possible for the STA_A to confirm that the medium is clear by receiving the CTS. Furthermore, when the STA_C receives a CTS that is not destined for its own station from the STA_B, the electric power calculation unit 183 calculates the received electrical power received with each of a plurality of beam patterns, and then, the determination unit 184 determines the beam direction in which the received electrical power at the time of CTS reception becomes a maximum. Then, the relevant direction in which the STA_B is positioned is stored as the direction of the stop setting person in the storage unit 150. After that, the STA_C sets the transmission stop period in accordance with the duration information described in the CTS.

After the SIFS has passed after the CTS is received, the STA_A performs beamforming so that the transmission beam is directed toward the position of the STA_B, and sends back data frames (Beamformed DATA).

On the other hand, when a frame transmission request is generated within the transmission stop period, the STA_C confirms whether or not the direction of the STA_D, which is the frame transmission destination, is known, that is, whether or not the direction in which the transmission beam should be directed has already been learned.

In the example shown in FIG. 10A, since the STA_C has already learned the direction of the optimal transmission beam with respect to the STA_D, the direction of the optimal transmission beam confirms whether or not the direction of the optimal transmission beam is separate from the direction of the stop setting person, which has been stored at the time of the setting of the transmission stop period.

The direction of the optimal transmission beam with respect to the STA_D is separate from the stop setting person direction, in which the STA_B is positioned. Therefore, the STA_C transmits a directional frame by directing a transmission beam in the direction of the optimal transmission beam despite the transmission stop period. Since the direction of the transmission beam is separate from the direction of the STA_B, the transmission frame of the STA_C will not collide with the data frame transmitted from the STA_A to the STA_B.

Figure 10B:
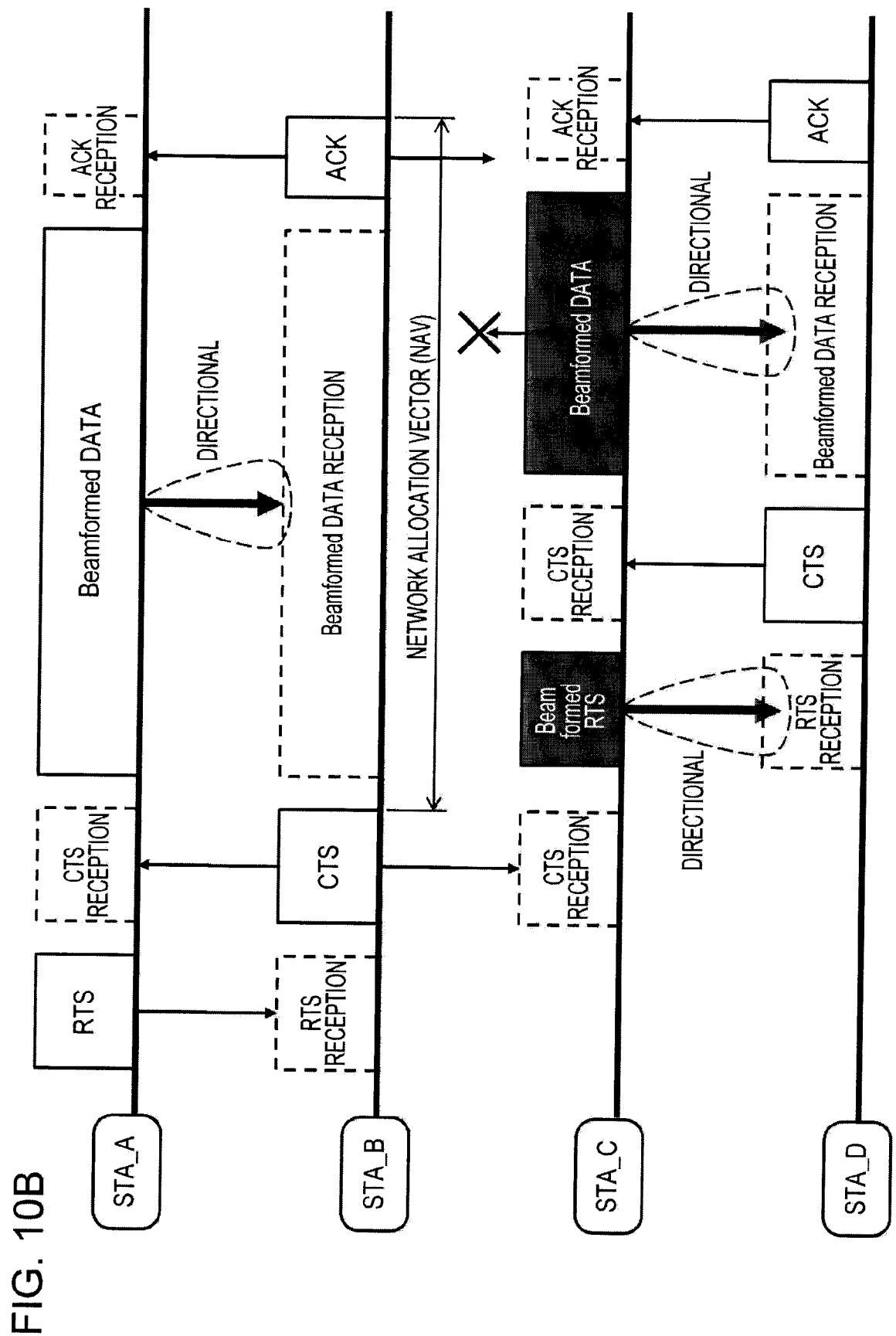
FIG. 10B illustrates another example of a signal transmission/reception sequence in a case where when the STA_A and the STA_B perform RTS/CTS handshake, the hidden terminal STA_C for the STA_A operates in accordance with FIGS. 8 and 9.

Furthermore, FIG. 10B illustrates another example of the signal transmission/reception sequence in a case where the hidden terminal STA_C for the STA_A operates in accordance with FIGS. 8 and 9 when the STA_A and the STA_B perform RTS/CTS handshake. However, it is assumed that each of the communication stations STA_A to STA_D is constituted by the communication apparatus 100 shown in FIGS. 2 to 4.

First, the STA_A confirms that a medium is clear for only a fixed period in accordance with the procedure of CSMA, and thereafter transmits the RTS to the STA_B, which is the data receiving side.

When the STA_B receives an RTS destined for its own station from the STA_A, the STA_B sends back a CTS to the STA_A after a predetermined frame interval SIFS has passed.

It is possible for the STA_A to confirm that the medium is clear by receiving the CTS. Furthermore, when the STA_C receives a CTS that is not destined for its own station from the STA_B, the electric power calculation unit 183 calculates received electrical power received with each of a plurality of beam patterns, and then, the determination unit 184 determines the beam direction in which the received electrical power at the time of CTS reception becomes a maximum. Then, the relevant direction of the position of the STA_B is stored as the direction of the stop setting person in the storage unit 150. After that, the STA_C sets the transmission stop period in accordance with the duration information described in the CTS.

After the SIFS has passed after the CTS is received, the STA_B performs beamforming so that the transmission beam is directed toward the position of the STA_B, and transmits data frames (Beamformed DATA).

On the other hand, when a frame transmission request is generated within the transmission stop period, the STA_C confirms whether or not the direction of the STA_D, which is the frame transmission destination, is known, that is, whether or not the direction in which the transmission beam should be directed has already been learned.

In the example shown in FIG. 10B, the STA_C has not already learned the direction of the optimal transmission beam with respect to the STA_D. Accordingly, the STA_C transmits an RTS (Beamformed RTS) destined for the STA_D by directing a transmission beam in the separation direction that is sufficiently separate from the direction of the stop setting person. Furthermore, the STA_C may wait for the reception of a CTS from the STA_D by directing the reception beam in the relevant separation direction.

In the example shown in the figure, since the STA_C could receive the CTS from the STA_D, it can be determined that the position of the STA_D is directed toward the relevant separation direction that is sufficiently separate from the direction of the stop setting person. Accordingly, the STA_C transmits directional data frames (Beamformed DATA) by directing a transmission beam in the direction of the frame transmission destination, which is the relevant separation direction.

The separation direction that is directed when a frame is transmitted to the STA_D is separate from the direction of the stop setting person in which the STA_B is positioned. Therefore, the STA_C transmits a directional frame by directing a transmission beam in the direction of the relevant optimal transmission beam despite the transmission stop period. Since the direction of the transmission beam is separate from the direction of the STA_B, the directional data frames (Beamformed DATA) transmitted by the STA_C will not collide with data frames transmitted from the STA_A to the STA_B. Then, when the transmission of the data frames ends, the STA_C waits for the reception of an ACK sent back from the STA_D. At that time, the STA_C may wait for the reception of a CTS from the STA_D by directing a reception beam in the relevant separation direction, and can receive an ACK from the STA_D without being interfered by the ACK from the STA_B as shown in the figure.

It can be understood from FIGS. 10A and 10B that it is possible for the STA_C to effectively use the transmission stop period so as to perform a millimeter-wave communication operation, and when viewed as the whole of the system, the number of communication stations through which simultaneous communication is possible is increased, and the throughput is increased.

Meanwhile, the communication apparatus 100 that operates as an access point (AP) or a terminal station (STA) may be, for example, a portable information terminal, such as a personal computer (PC), a mobile phone, or a PDA (Personal Digital Assistant), an information device, such as a portable music player or a game machine, or a wireless communication module installed in a television receiver or other home information appliances.

Figure 12:
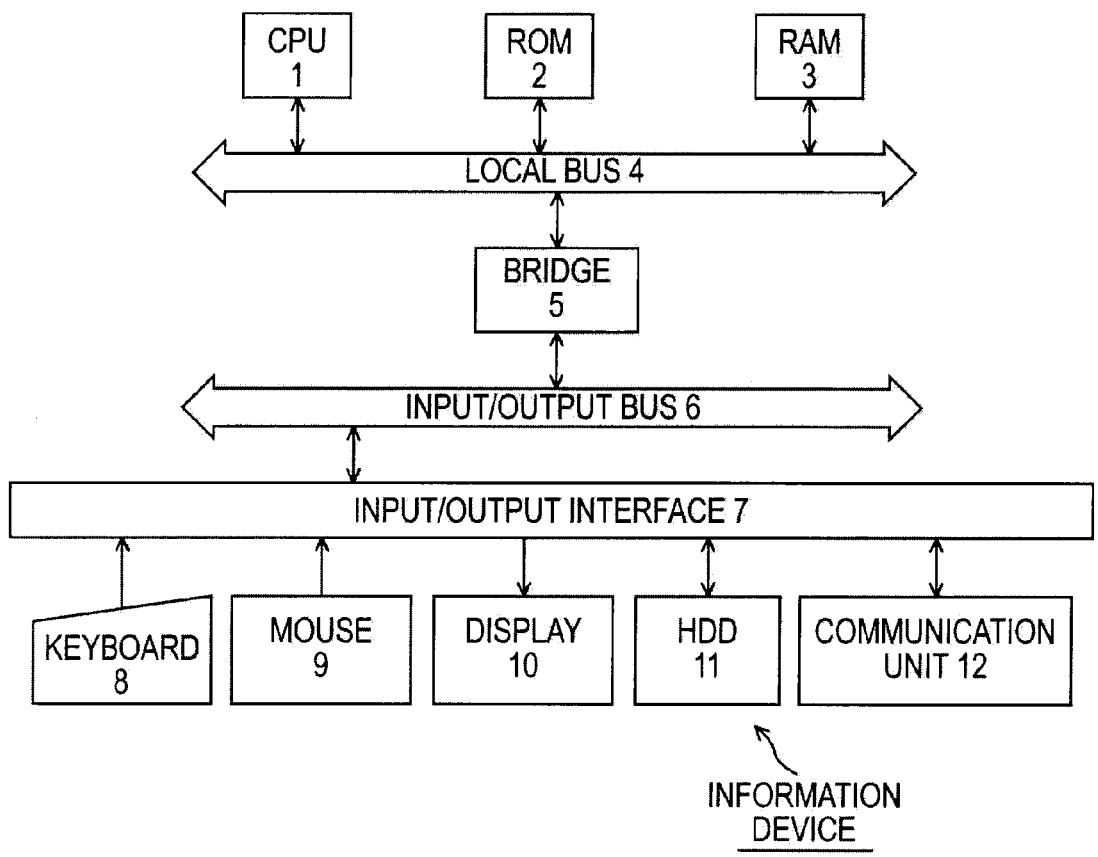
FIG. 12 illustrates an example of the configuration of an information apparatus having a modularized communication apparatus 100 installed therein.

FIG. 12 illustrates an example of the configuration of an information apparatus having the modularized communication apparatus 100 installed therein.

A CPU (Central Processing Unit) 1 executes a program stored in a ROM (Read Only Memory) 2 or a hard disk drive (HDD) 11 under a program execution environment provided by an operating system (OS). For example, a reception frame synchronization process (to be described later) or partial processing thereof can be realized in such a form that the CPU 1 executes a predetermined program.

The ROM 2 has stored permanently therein program codes of POST (Power On Self Test), BIOS (Basic Input Output System), and the like. A RAM (Random Access Memory) 3 is used to load thereinto a program stored in the ROM 2 and the HDD (Hard Disk Drive) 11 when the CPU 1 executes the program, or is used to temporarily hold operation data of the program being executed. These are interconnected with one another through a local bus 4 that is directly connected to the local pin of the CPU 1.

The local bus 4 is connected to an input/output bus 6, such as a PCI (Peripheral Component Interconnect) bus, through a bridge 5.

A keyboard 8, and a pointing device 9 such as a mouse are input devices that are operated by a user. A display 10, which is made up of an LCD (Liquid Crystal Display) or a CRT (Cathode Ray Tube), displays various information in the form of text and images.

The HDD 11 is a drive unit having incorporated thereinto a hard disk as a recording medium, and drives the hard disk. The hard disk is used to install programs, such as the operating system and various applications, which are executed by the CPU 1, and is used to store data files and the like.

A communication unit 12 is a wireless communication interface that is formed by modularizing the wireless communication apparatus 100, operates as an access point or as a terminal station in an infrastructure mode, or operates in an adhoc mode, and performs communication with other communication terminals that exist in the communication range. The operation of the wireless communication apparatus 100 has already been described.

Industrial Applicability

In the foregoing, the present invention has been described in detail while referring to specific embodiments. However, it is obvious that a person skilled in the art can make modifications and substitutions of the embodiments within the scope and spirit of the present invention.

In this specification, a description has been mainly given of an embodiment in which the millimeter-wave communication scheme uses a 60 GHz band used in IEEE 802.15.3c. However, the gist of the present invention is not necessarily limited to a specific frequency band. Furthermore, not limited to millimeter-wave communication, other directional communications may be used.

In summary, the present invention has been disclosed in the form of examples, and the described content of the present specification should not be construed as being limiting. In order to determine the gist of the present invention, reference should be made to the claims.

EXPLANATION OF REFERENCE NUMERALS

1 . . . CPU
2 . . . ROM
3 . . . RAM
4 . . . local bus
5 . . . bridge
6 . . . input/output bus
7 . . . input/output interface
8 . . . keyboard
9 . . . pointing device (mouse)
10 . . . display
11 . . . HDD
12 . . . communication unit
100 . . . communication apparatus
150 . . . storage unit
160a to 160n . . . plural antennas
170 . . . wireless communication unit
172 . . . analog unit
174 . . . AD conversion unit
176 . . . DA conversion unit
180 . . . digital unit
181 . . . synchronization unit
182 . . . reception beam processing unit
183 . . . power calculation unit
184 . . . determination unit
185 . . . demodulation and decoding unit
186 . . . coding and modulation unit
187 . . . transmission beam processing unit
190 . . . control unit

The invention claimed is:

1. A communication apparatus comprising:
a wireless communication unit configured to perform directional wireless communication in accordance with a communication scheme that uses a predetermined high-frequency band,
wherein when a transmission stop request frame that requests that a predetermined transmission stop period be set is received, a direction of a transmission source from which the transmission stop request frame is transmitted is stored, and the transmission stop period is set,
wherein within the transmission stop period, transmission of frames is controlled in accordance with the direction of the transmission source,
wherein within the transmission stop period, a transmission start request frame (RTS: Request To Send) is transmitted by directing a transmission beam of the wireless communication unit in a separation direction that is separate from the direction of the transmission source,
wherein, an acknowledgement frame (CTS: Clear To Send) received in response to the transmitted transmission start request frame (RTS: Request To Send) from a device located in the separation direction indicates that the device is located in a direction that is sufficiently separate from the direction of the transmission source so as to avoid obstruction of transmission, and data frames are transmitted in response to the received acknowledgement frame (CTS: Clear To Send) by directing a transmission beam of the wireless communication unit toward the device located in the separation direction, and
wherein when a direction of a frame transmission destination corresponding to the separation direction is separate from the direction of the transmission source, within the transmission stop period, transmission of frames is performed by directing a transmission beam of the wireless communication unit toward the device located in the direction of the frame transmission destination.

2. The communication apparatus according to claim 1, further comprising:
a power calculation unit that calculates received electrical power when a frame is received in each of the plurality of beam directions; and
a determination unit that determines a beam direction in which the received electrical power becomes a maximum among the plurality of beam directions,
wherein when the transmission stop request frame that requests that a predetermined transmission stop period be set is received, a beam direction in which the received electrical power of the transmission stop request frame becomes a maximum is stored as a direction of the transmission source, and the transmission stop period is set.

3. The communication apparatus according to claim 1, further comprising:
a power calculation unit that calculates received electrical power when frames are received in each of the plurality of beam directions; and
a determination unit that determines a beam direction in which the received electrical power becomes a maximum among the plurality of beam directions,
wherein data frames are transmitted by directing a transmission beam of the wireless communication unit in a beam direction in which the received electrical power of the acknowledgement frame becomes a maximum.

4. The communication apparatus according to claim 1, wherein the communication scheme according to which the wireless communication unit performs directional wireless communication uses millimeter waves.

5. A communication method in a communication apparatus including a wireless communication unit configured to perform directional wireless communication in accordance with a communication scheme that uses a predetermined high-frequency band, the communication method comprising:
a step of storing, when a transmission stop request frame that requests that a predetermined transmission stop period be set is received, a direction of a transmission source from which the transmission stop request frame is transmitted;
a step of setting a transmission stop period in response to the reception of the transmission stop request frame that requests that a predetermined transmission stop period be set; and
a step of controlling, when a frame transmission request is generated within the transmission stop period, transmission of the relevant transmission request frame in accordance with the direction of the transmission source,
wherein within the transmission stop period, a transmission start request frame (RTS: Request To Send) is transmitted by directing a transmission beam of the wireless communication unit in a separation direction that is separate from the direction of the transmission source,
wherein, an acknowledgement frame (CTS: Clear To Send) received in response to the transmitted transmission start request frame (RTS: Request To Send) from a device located in the separation direction indicates that the device is located in a direction that is sufficiently separate from the direction of the transmission source so as to avoid obstruction of transmission, and data frames are transmitted in response to the received acknowledgement frame (CTS: Clear To Send) by directing a transmission beam of the wireless communication unit toward the device located in the separation direction, and
wherein when a direction of a frame transmission destination corresponding to the separation direction is separate from the direction of the transmission source, within the transmission stop period, transmission of frames is performed by directing a transmission beam of the wireless communication unit toward the device located in the direction of the frame transmission destination.

6. The communication method according to claim 5, wherein the communication scheme according to which the wireless communication unit performs directional wireless communication uses millimeter waves.

7. A non-transitory computer-readable medium having embodied thereon a program, which when executed by a computer, causes the computer to perform a communication process in a communication apparatus, the communication apparatus including a wireless communication unit configured to perform directional wireless communication in accordance with a communication scheme that uses a predetermined high-frequency band, the communication process comprising:
storing, when a transmission stop request frame that requests that a predetermined transmission stop period be set is received, a direction of a transmission source from which the transmission stop request frame is transmitted;
setting the transmission stop period in response to the reception of the transmission stop request frame that requests that a predetermined transmission stop period be set; and
controlling, when a frame transmission request is generated within the transmission stop period, transmission of the relevant transmission request frame in accordance with the direction of the transmission source, wherein within the transmission stop period, a transmission start request frame (RTS: Request To Send) is transmitted by directing a transmission beam of the wireless communication unit in a separation direction that is separate from the direction of the transmission source, wherein, an acknowledgement frame (CTS: Clear To Send) received in response to the transmitted transmission start request frame (RTS: Request To Send) from a device located in the separation direction indicates that the device is located in a direction that is sufficiently separate from the direction of the transmission source so as to avoid obstruction of transmission, and data frames are transmitted in response to the received acknowledgement frame (CTS: Clear To Send) by directing a transmission beam of the wireless communication unit toward the device located in the separation direction, and wherein when a direction of a frame transmission destination corresponding to the separation direction is separate from the direction of the transmission source, within the transmission stop period, transmission of frames is performed by directing a transmission beam of the wireless communication unit toward the device located in the direction of the frame transmission destination.

8. The computer-readable medium according to claim 7, wherein the communication scheme according to which the wireless communication unit performs directional wireless communication uses millimeter waves.

9. A communication system comprising:
   a peripheral communication apparatus that transmits a transmission stop request frame that requests that a predetermined transmission stop period be set;
   a data-transmission-side communication apparatus that includes a wireless communication unit configured to perform directional wireless communication in accordance with a communication scheme that uses a predetermined high-frequency band, that sets the transmission stop period in response to the transmission stop request frame being received from the peripheral communication apparatus, and that controls the transmission of frames in accordance with a direction in which the peripheral communication apparatus is positioned within the transmission stop period; and
   a data-receiving-side communication apparatus serving as a transmission destination of the frame from the data-transmission-side communication apparatus, wherein within the transmission stop period, a transmission start request frame (RTS: Request To Send) is transmitted by directing a transmission beam of the wireless communication unit in a separation direction that is separate from the direction of the transmission source, wherein, an acknowledgement frame (CTS: Clear To Send) received in response to the transmitted transmission start request frame (RTS: Request To Send) from a device located in the separation direction indicates that the device is located in a direction that is sufficiently separate from the direction of the transmission source so as to avoid obstruction of transmission, and data frames are transmitted in response to the received acknowledgement frame (CTS: Clear To Send) by directing a transmission beam of the wireless communication unit toward the device located in the separation direction, and wherein when a direction of a frame transmission destination corresponding to the separation direction is separate from the direction of the transmission source, within the transmission stop period, transmission of frames is performed by directing a transmission beam of the wireless communication unit toward the device located in the direction of the frame transmission destination.

10. The communication system according to claim 9, wherein the communication scheme according to which the wireless communication unit performs directional wireless communication uses millimeter waves.

* * * * *